United States Patent
DeLong et al.

(10) Patent No.: US 7,059,646 B1
(45) Date of Patent: Jun. 13, 2006

(54) CARGO MANAGEMENT SYSTEM HAVING VEHICLE LOAD FLOOR WITH CARGO CAGE

(75) Inventors: Aaron Michael DeLong, Oxford, MI (US); Gerald Krause, Utica, MI (US); Frank Violet, Troy, MI (US); John Michael Applin, Fenton, MI (US)

(73) Assignee: LEAR Corporation, Southfield, MI (US)

( * ) Notice: Subject to any disclaimer, the term of this patent is extended or adjusted under 35 U.S.C. 154(b) by 0 days.

(21) Appl. No.: 10/904,720

(22) Filed: Nov. 24, 2004

(51) Int. Cl.
*B60P 7/02* (2006.01)

(52) U.S. Cl. .............................. 296/24.43; 296/37.14; 296/37.16; 296/24.44

(58) Field of Classification Search ............... 296/24.4, 296/24.43, 24.46, 37.14, 37.16, 24.44; 108/44; 224/564
See application file for complete search history.

(56) References Cited

U.S. PATENT DOCUMENTS

| | | | |
|---|---|---|---|
| 5,484,091 A | 1/1996 | Malinowski et al. | |
| 6,050,202 A | 4/2000 | Thompson | |
| 6,113,172 A | 9/2000 | Chaloult et al. | |
| 6,176,535 B1 | 1/2001 | Chaloult et al. | |
| 6,290,277 B1 * | 9/2001 | Spykerman et al. | 296/24.43 |
| 6,386,612 B1 | 5/2002 | Hofmann et al. | |
| 6,481,773 B1 * | 11/2002 | Salani et al. | 296/37.16 |
| 6,623,060 B1 | 9/2003 | Gehring et al. | |
| 6,644,709 B1 * | 11/2003 | Inagaki et al. | 296/37.16 |
| 6,676,184 B1 | 1/2004 | Gehring et al. | |
| 2002/0070574 A1 * | 6/2002 | Carlsson et al. | 296/37.14 |
| 2003/0000982 A1 | 1/2003 | Gehring et al. | |
| 2003/0090120 A1 * | 5/2003 | Barber et al. | 296/37.5 |

\* cited by examiner

*Primary Examiner*—Dennis H. Pedder
(74) *Attorney, Agent, or Firm*—Bir Law, PLC; David S. Bir

(57) ABSTRACT

A cargo management system for a vehicle includes a substantially rigid load floor panel pivotally connected along a first edge to a base to provide a load floor substantially flush with a vehicle floor when stowed, and pivotally connected along an opposite edge to a rigid grid that may be deployed in a first position above and generally parallel to the base, and a second position generally transverse to the base to extend above any vehicle seats and generally separate a cargo area from a passenger area. The cargo management system may also include a secondary door, panel, or other device to cover a storage well or compartment of the base and to support additional cargo when the load floor panel is deployed.

18 Claims, 4 Drawing Sheets

CARGO MANAGEMENT SYSTEM HAVING VEHICLE LOAD FLOOR WITH CARGO CAGE

FIELD OF THE INVENTION

The present invention relates to systems and methods for storing and/or securing vehicle cargo.

BACKGROUND ART

Various systems have been developed to provide flexible configurations for vehicle interiors to accommodate a varying number of passengers in addition to cargo of different shapes and sizes. Reconfigurable seating options often provide for a significant increase in the area available to transport cargo when needed. However, cargo restraint or management systems are typically not provided for this reconfigurable space. Various types of OEM and aftermarket accessories have been developed for use in organizing and securing cargo. However, currently available cargo management, organization, and/or restraint systems may also occupy significant space when not in use, may be removed from the vehicle so that they are not available when needed, or may interfere with loading or unloading bulky or heavy cargo. In addition, such systems are often not aesthetically pleasing to consumers, particularly when not being used.

SUMMARY OF THE INVENTION

The present invention includes a cargo management system for a vehicle having a substantially rigid load floor panel pivotally connected along a first edge to a base to provide a load floor substantially flush with a vehicle floor when stowed, and pivotally connected along an opposite edge to a rigid grid that may be deployed in a first position above and generally parallel to the base, and a second position generally transverse to the base to extend above any vehicle seats to generally separate a cargo area from a passenger area. The cargo management system may also include a secondary door, panel, or other device to cover a storage well or compartment of the base when the load floor panel is deployed to support additional cargo and/or cover cargo stored in the base.

Various embodiments of the present invention include a rigid grid that pivots nearly 360 degrees about the rigid load floor panel to provide a third position in contact with the rigid load floor panel and exposed to the cargo area to secure cargo via auxiliary hooks, straps, cords, and the like. The rigid grid preferably includes sufficient open space so as not to significantly impair driver visibility through any side or rear windows when in the fully deployed position extending above any vehicle seats while also having sufficient strength to function as a shelf and/or hanger to accommodate various types and sizes of cargo and to separate cargo from the passenger space. Embodiments also include a load floor panel and/or secondary panel having holes or slots to engage one or more cargo management devices adapted to receive and secure particular types of cargo. Similarly, the load floor panel and/or secondary panel or cover may include integrated foldable supports that may be selectively extended to secure cargo when the load floor panel and/or secondary panel are opened.

The present invention provides a number of advantages. For example, the present invention provides flexible, integrated cargo storage that is aesthetically pleasing and may be substantially hidden from view and out of the way when not in use. The cargo system of the present invention can accommodate and secure varying types and sizes of cargo. The invention provides a substantially flush load floor when stowed to facilitate loading and unloading of bulky and/or heavy cargo while effectively separating the cargo area from the passenger area when fully deployed. In either the partially or fully deployed positions, the invention creates a cargo cage or space that may be used to transport pets or animals, for example. The rigid grid of the present invention also provides a configuration to accommodate large cargo to resist sliding even if unsecured, while offering numerous tie down points to secure cargo with straps, cords, hooks, and the like. The invention may also be adapted using integrated or add-on modules to secure particular types of cargo, such as golf clubs or scuba tanks, for example.

The above advantages and other advantages and features of the present invention will be readily apparent from the following detailed description of the preferred embodiments when taken in connection with the accompanying drawings.

DETAILED DESCRIPTION OF THE PREFERRED EMBODIMENT(S)

As those of ordinary skill in the art will understand, various features of the present invention as illustrated and described with reference to any one of the Figures may be combined with features illustrated in one or more other Figures to produce embodiments of the present invention that are not explicitly illustrated or described. The combinations of features illustrated provide representative embodiments for typical applications. However, various combinations and modifications of the features consistent with the teachings of the present invention may be desired for particular applications or implementations.

Figure 1:
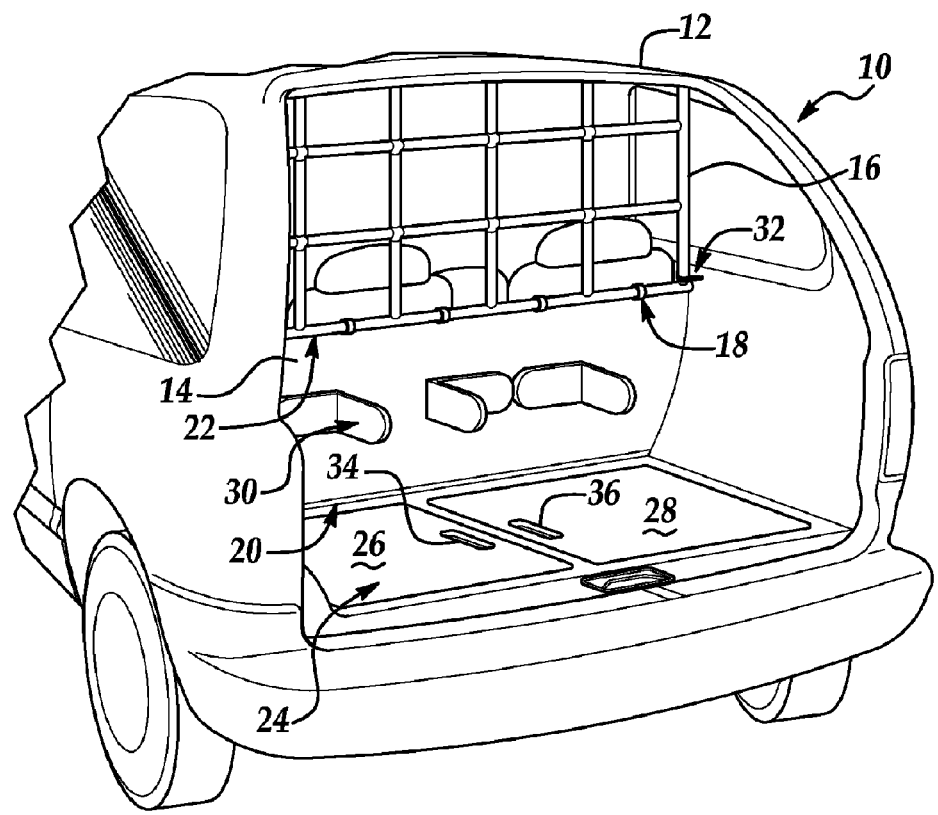
FIG. 1 is a perspective view of a representative application for a cargo management system having a load floor with integrated cargo cage deployed in a first configuration extending above the vehicle seats and having optional cargo brackets according to one embodiment of the present invention.
Figure 2:
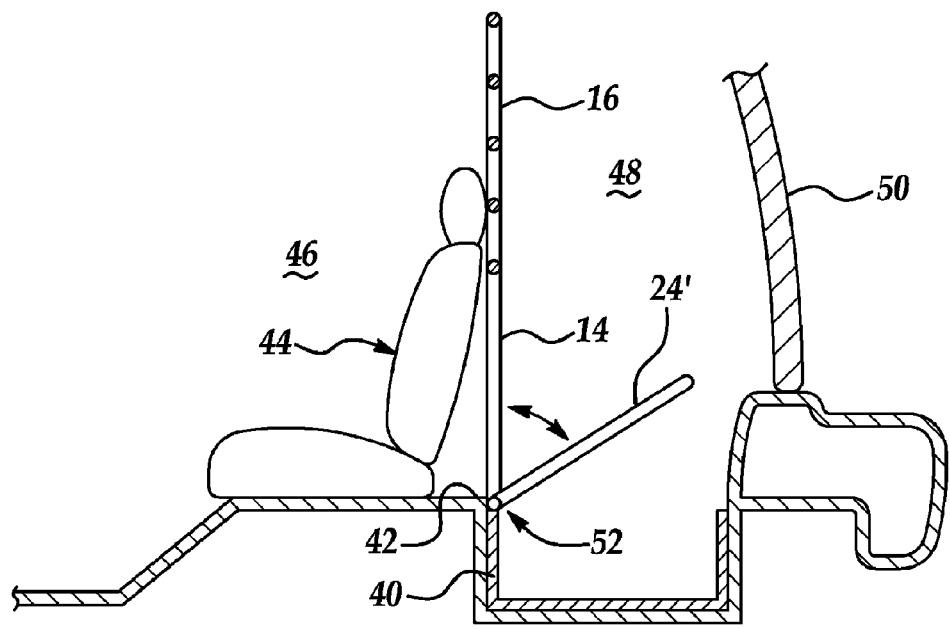
FIG. 2 is a partial cross-section illustrating a cargo management system with an alternative secondary or close out panel or door according to one embodiment of the present invention.

Referring now to FIGS. 1 and 2, a cargo management system for a vehicle according to one embodiment of the present invention is shown. System 10 is illustrated installed in a representative vehicle 12 and includes a load floor panel 14 pivotally connected to a rigid grid 16 by one or more hinges 18 or similar devices. Load floor panel 14 is in turn pivotally connected by a first edge 20 to a vehicle floor component or base 40 attached to vehicle floor 42. A second edge 22 of load floor panel 14 is pivotally connected to grid 16 by one or more hinges or similar devices 18.

A closeout cover, indicated generally by reference numerals 24, 24', cooperates with base 40 and/or vehicle floor 42 to conceal cargo stored in the storage compartment in the vehicle floor and to provide a secondary load floor when load floor panel 14 is in the deployed position as illustrated. In the embodiment of FIG. 1, closeout cover 24 is implemented by individual doors or panels 26, 28. Those of ordinary skill in the art will recognize various alternative implementations for a closeout cover 24, such as represented by a single closeout cover 24' in FIG. 2. For example, in the embodiment illustrated in FIG. 1, closeout cover 24 includes two doors that may pivot about an axis generally perpendicular to the pivot axis of load floor panel 14. Alternatively, doors or panels 26, 28 may be implemented by accordion-style, telescoping, sliding, or rolling doors, for example, with appropriate handles or holes 34, 36 to facilitate opening and closing of the corresponding access panel, panels, or doors.

As also shown in the embodiment of FIG. 1, the present invention may include one or more cargo management devices 30 that extend into the cargo area 48 to secure various types of cargo. Cargo management devices 30 may be implemented by integrated folding arms or extensions that may be contained in a corresponding recess in the underside of load floor panel 14, for example. Alternatively, various holes, slots, or other devices may be provided in load floor panel 14 and/or closeout cover 24 to accommodate various types of cargo management devices or modules. As an example, a cargo module may be adapted to secure various types of items and hold them in an upright position, such as golf clubs or diving tanks.

As shown in FIGS. 1 and 2, cargo management system 10 is deployed by raising or pivoting load floor panel 14 about its first edge 20, which is connected to base 40 or another component secured to vehicle floor 42. Rigid grid 16 is pivoted about the second edge 22 of load floor panel 14 and extended toward a roof of vehicle 12 beyond one or more seats 44 such that it is generally transverse or perpendicular to vehicle floor 42 (or the bottom of the storage compartment defined by base 40). Of course, the angles of rigid grid 16 and load floor panel 14 relative to the base or vehicle floor may vary depending upon various application and/or implementation specific variables, such as the location and angle of any vehicle seats 44, for example. Rigid grid 16 may be secured via one or more devices 32 incorporated into the interior of vehicle 12 positioned along the sides, roof/headliner, and/or vehicle seats 44 depending upon the particular application and implementation. Optional cargo management devices 30 may be deployed to separate and/or secure one or more items in an upright position, for example. Closeout covers 24, 24' may be opened to provide access to the underlying storage compartment 40 and closed to conceal any stowed cargo, while also providing an additional or secondary load floor to support cargo when load floor panel 14 is in the deployed position as illustrated. In the embodiment of FIG. 2, closeout cover 24' is implemented by a single panel or door that pivots about the same axis, or a similarly oriented axis as load floor panel 14. When deployed as illustrated in FIGS. 1 and 2, system 10 operates to separate cargo area 48 between grid 16 (and load floor panel 14) and tailgate 50 from a passenger area 46 of vehicle 12.

Those of ordinary skill in the art will recognize that division or separation of cargo area 48 and passenger area 46 is relative to the position and number of cargo management devices employed in a particular vehicle. Although the representative applications for the embodiments illustrated show a cargo management system of the present invention located behind the last row of seats, the invention may be located anywhere in the vehicle and/or at multiple locations to provide maximum flexibility. For example, a cargo management system having a folding panel with a cargo cage portion may be located between rows of removable or folding seats.

Figure 3:
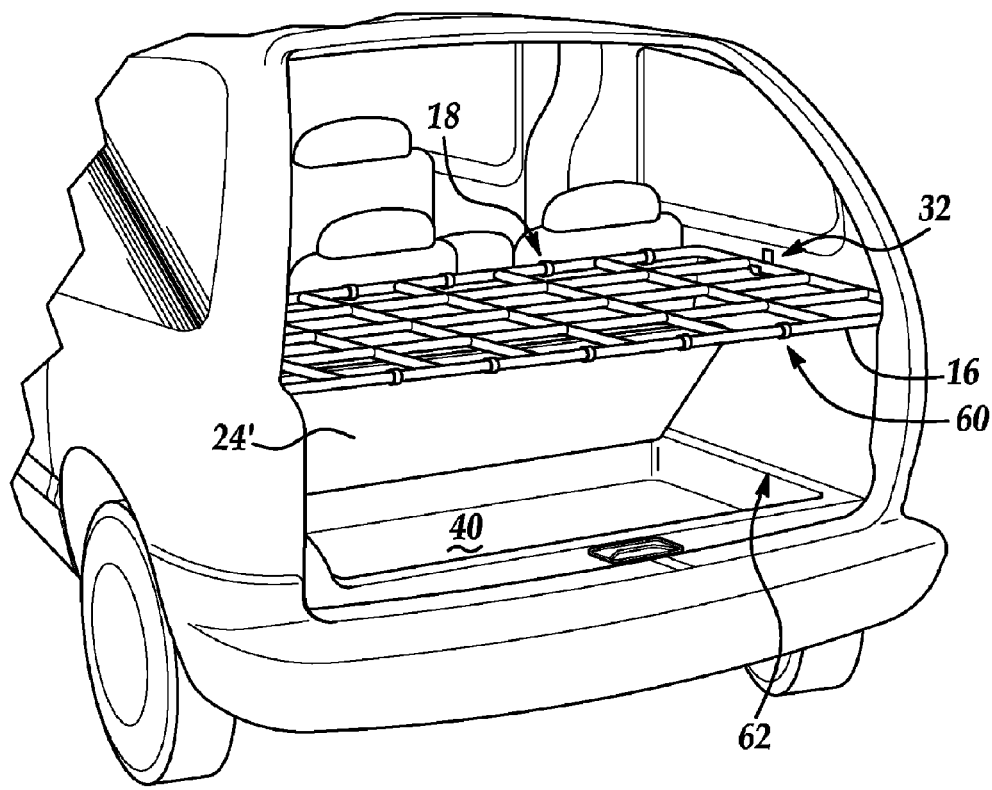
FIG. 3 is a perspective view of a representative application for a cargo management system having a load floor with integrated cargo cage deployed in a second position for use as a hanger/shelf according to one embodiment of the present invention.
Figure 4:
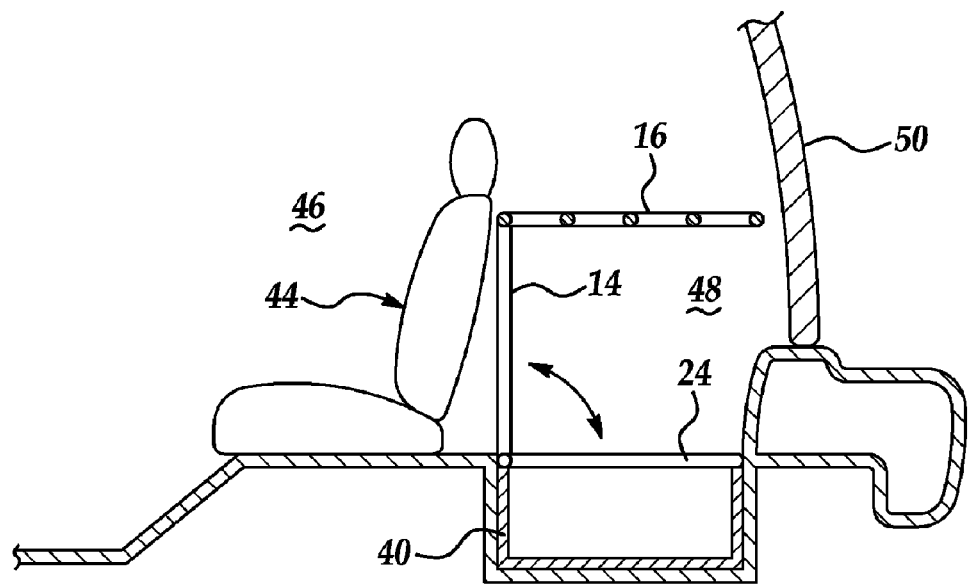
FIG. 4 is a partial cross-section illustrating a cargo management system deployed in a second position according to one embodiment of the present invention.

FIGS. 3 and 4 illustrate a representative application for a cargo management system having a load floor with integrated cargo cage deployed in a second position for use as a hanger/shelf according to one embodiment of the present invention. As shown in FIG. 3, load floor panel 14 is opened to a generally transverse or perpendicular orientation (in this application) with rigid cage 16 secured by one or more latching devices 32 in a generally horizontal position above and parallel to base 40 or the vehicle floor 42. This configuration provides a generally horizontal surface for storage of cargo on the horizontal surface while containing any cargo in the cargo space 48 below the horizontal surface. Rigid grid 16 functions as a multi-functional shelf that also provides numerous anchor points along the grid components and intersections to secure cargo to the shelf and/or hang cargo below the shelf. Depending upon the particular application and implementation, one or more seats 44 may also include latching devices (not specifically illustrated) to secure load floor panel 14 in an open position. Closeout cover or secondary load floor panel 24, is shown in a partially open position in FIG. 3 and a closed position in the cross-section of FIG. 4. Similar to the position of the cargo management device embodiment illustrated in FIGS. 1 and 2, when rigid grid 16 is disposed in a generally horizontal position as illustrated in the embodiments of FIGS. 3 and 4, cargo management system 10 separates cargo area 48 from passenger area 46 and operates to retain cargo within cargo area 48. Those of ordinary skill in the art will recognize that the open spaces of rigid grid 16 make cargo management system 10 suitable for transporting live animals while maintaining separation of cargo area 48 from passenger area 46 as illustrated in either of the embodiments and configurations of FIGS. 1–4.

Figure 5:
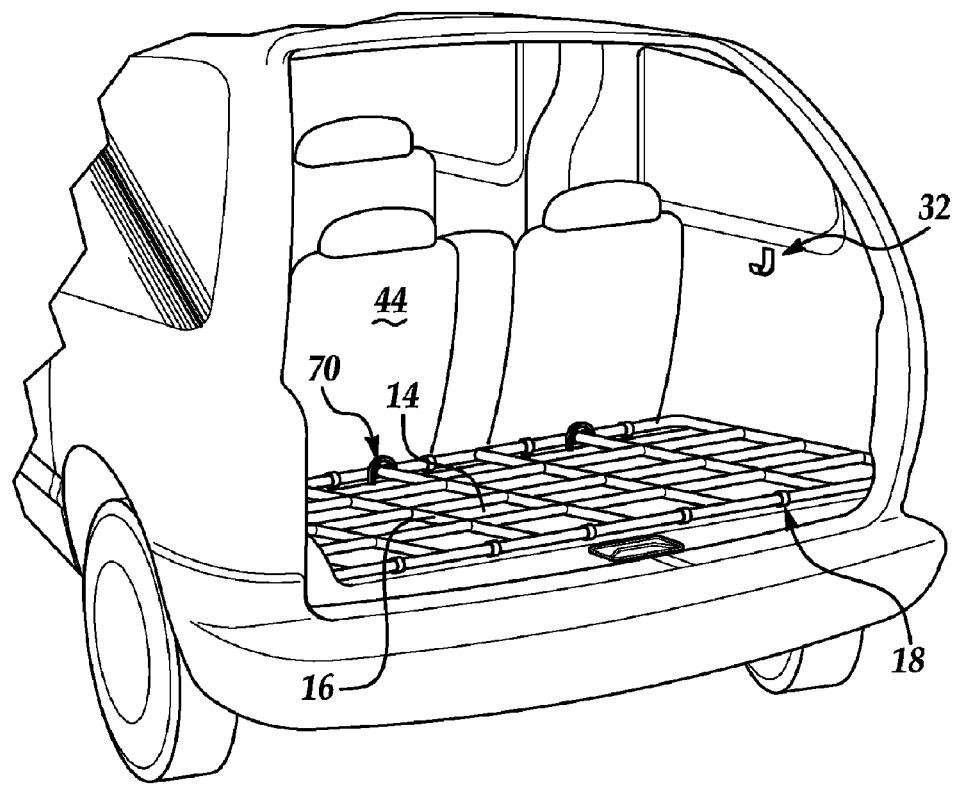
FIG. 5 is a perspective view of a representative application for a cargo management system with integrated cargo cage deployed in a third position according to one embodiment of the present invention.
Figure 6:
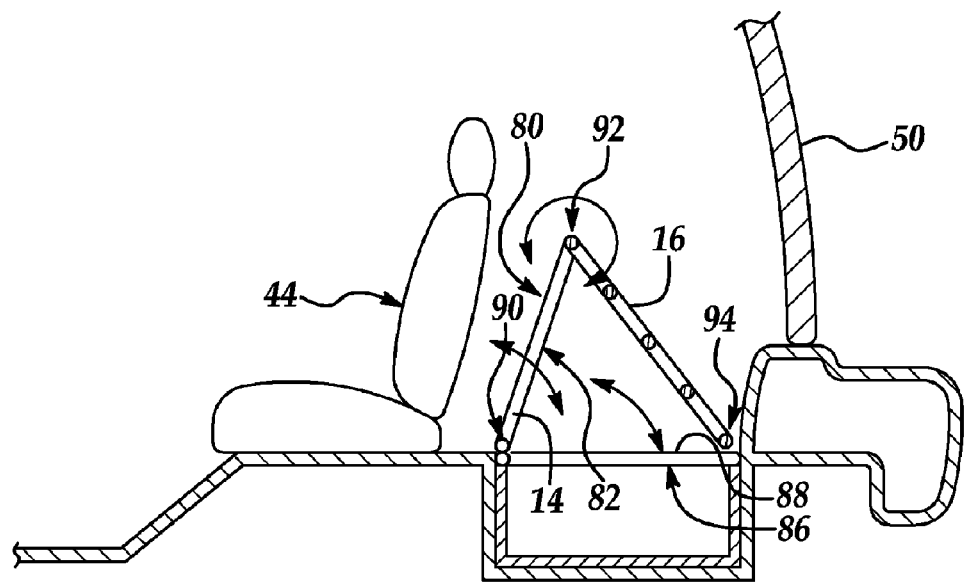
FIG. 6 is a partial cross-section illustrating operation of a cargo management system according to one embodiment of the present invention.

FIGS. 5 and 6 illustrate an optional position or configuration for a cargo management system including a load floor with an integrated cargo cage according to one embodiment of the present invention. Load floor panel 14 is connected along a first edge 90 to a vehicle floor component or base to pivot between a stowed position substantially flush with the vehicle floor and a deployed position extending upward from the vehicle floor. In this representative embodiment, load floor panel 14 pivots about ninety degrees and may be optionally secured in an open position to the back of seat 44 as described in greater detail below. The actual angle between load floor panel 14 and the vehicle floor may be more or less than ninety degrees depending upon the particular application and the position and angle of seats 44.

Perforated panel or grid 16 is pivotably connected at one or more locations along second edge 92 of load floor panel 14 so that grid 16 can rotate or pivot nearly one complete revolution about edge 92 to contact top side 80 or underside 82 of load floor panel 14. This allows second edge 94 of grid 16 to contact or nearly contact first edge 90 of load floor panel 14.

In the position or configuration illustrated in FIG. 6, grid 16 has been pivoted about edge 92 nearly 360 degrees or substantially one revolution such that grid 16 contacts top side 80 of load floor panel 14. Grid or perforated panel 16 may be optionally removably secured along edge 94 to load floor panel 14, to the vehicle floor, lower portion of seat 44, or another vehicle component secured to the vehicle floor, by one or more latching or strapping devices 70. For example, grid 16 may lock into one or more receivers mounted on vehicle floor or the back of seats 44, or a hook-and-loop type fastener may be used to resist or prevent grid 16 from pivoting. Preferably, any receivers or other latching devices fold flat or flush with the vehicle floor to facilitate loading and unloading of bulky and/or heavy cargo when the cargo management system is stowed without interference. As shown in the configuration of FIG. 5, grid 16 is disposed in a position generally parallel to and resting on or supported by load floor panel 14. Exposing grid 16 to the cargo area provides a variety of options for securing cargo within the cargo area. For example, grid 16 provides numerous anchor points for securing cargo with cords, straps, hooks, and the like. In addition, grid 16 provides several open spaces that could prevent small cargo placed in the spaces from sliding and/or tipping. Grid 16 may also accommodate one or more cargo management modules or devices particularly adapted or suited for specialized cargo.

In another optional configuration, grid 16 may be secured to underside 82 of load floor panel 14 along first edge 90, with load floor panel 14 secured to the back of seat 44 or held in an open position by lateral latches, hooks, straps, or other devices, such as represented generally by device 32. This configuration secures grid 16 in a generally vertical position transverse or perpendicular to the vehicle floor to provide a variety of options and anchor points for securing cargo as described above. Similarly, depending upon the particular application and seating configuration, grid 16 may also be secured to the top side of load floor panel 14 similar to the configuration of FIG. 5, but with load floor panel 14 secured in a generally vertical position so grid 16 is exposed to the forward portion of the vehicle, i.e. to the left in FIG. 6.

As also shown in FIG. 6, a second load floor panel or closeout cover may optionally be used to provide access to the cargo storage space so that top side 88 provides a secondary load floor when load floor 14 is in a deployed position. The second load floor panel or closeout cover may be pivotably connected at one or more points along a first edge to a vehicle floor component or base with one or more integrated cargo management devices positioned on underside 86 to be exposed when the second load floor panel is opened.

Figure 7:
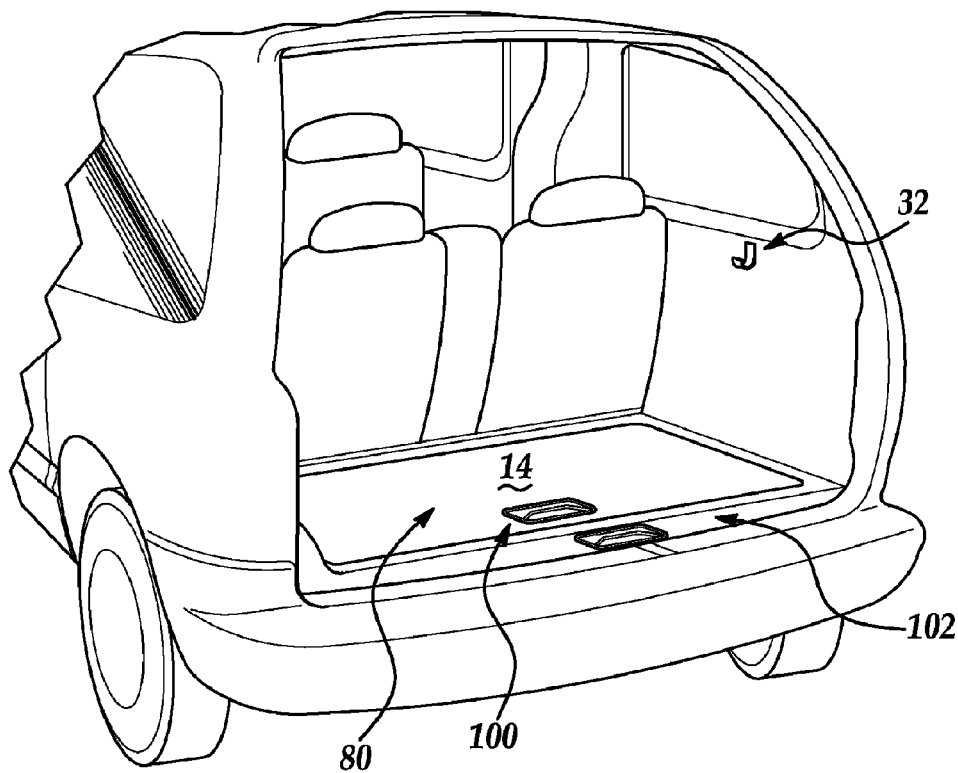
FIG. 7 is a perspective view of a representative application for a cargo management system having a load floor with integrated cargo cage in a stowed position according to one embodiment of the present invention.

FIG. 7 is a perspective view illustrating a stowed position for a cargo management system in a representative application according to one embodiment of the present invention. In the stowed position, a cargo management system according to the present invention preferably includes a handle, recess, or similar device 100 on or in top surface 80 of load floor panel 14 to facilitate opening and closing of panel 14. In the illustrated closed position, top side 80 of load floor panel 14 is preferably flush relative to surrounding portions 102 of the vehicle floor to facilitate loading and unloading of large and/or heavy cargo without interference. In addition, this provides an aesthetically pleasing configuration with the cargo cage or grid and any stowed cargo hidden from view.

Figure 8:
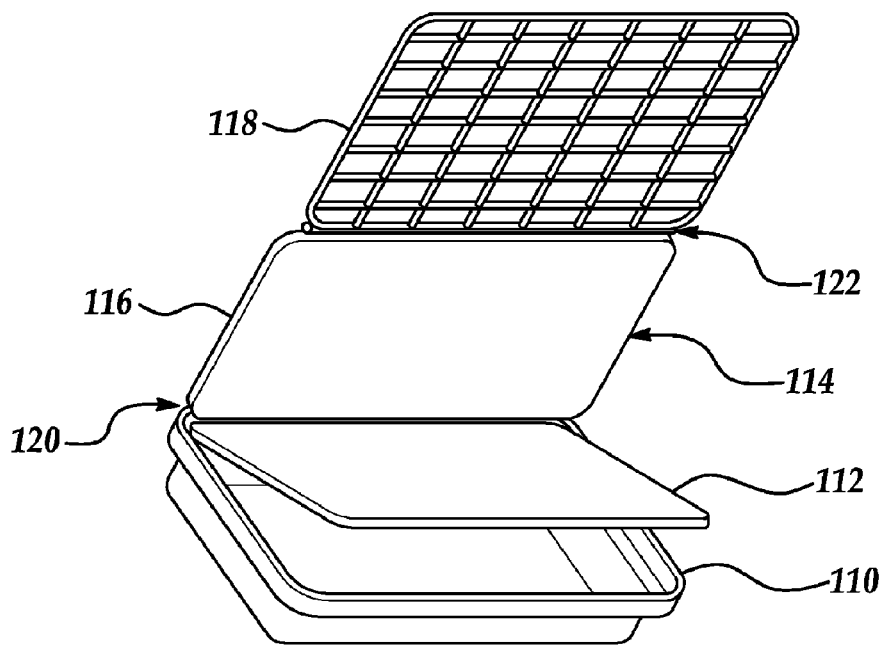
FIG. 8 is a perspective view of a modular cargo management system having a load floor with integrated cargo cage according to one embodiment of the present invention.

FIG. 8 illustrates a cargo management system or device for use in a vehicle having a cargo storage compartment in a vehicle floor according to one embodiment of the present invention. A base 110 includes sides and optionally a bottom (not specifically illustrated) that may extend at least partially into a storage compartment in a vehicle floor. An opening in base 110 provides access to the storage compartment to facilitate storage and retrieval of cargo with an optional closeout panel 112 that pivots about a first edge or pivot axis 120 to selectively cover the opening in base 110. A foldable panel 114 includes a solid portion 116 with a first edge connected to pivot about edge or pivot axis 120 between a stowed position generally horizontal or parallel to base 110 and covering the opening, and a deployed position providing access to the opening and extending generally upward from the base. Foldable panel 114 also includes a perforated or grid portion 118 foldable along a second edge or pivot axis 122 generally parallel to first edge or pivot axis 120 of solid portion 116 to contact either side of solid portion 116. Perforated or grid portion 118 is positionable between at least a generally horizontal position to support cargo and contain cargo beneath portion 118 and a generally vertical position extending away from base 110.

As can be seen by the various representative embodiments illustrated and described with reference to the Figures, the present invention provides flexible, integrated cargo storage that is aesthetically pleasing and may be substantially hidden from view and out of the way when not in use. The cargo system of the present invention can accommodate and secure varying types and sizes of cargo. The invention provides a substantially flush load floor when stowed to facilitate loading and unloading of bulky and/or heavy cargo while effectively separating the cargo area from the passenger area when deployed. In either the partially or fully deployed positions, the invention creates a cargo cage or space that may be used to transport pets or animals, for example. The rigid grid of the present invention also provides a configuration to accommodate large cargo to resist sliding even if unsecured, while offering numerous anchor or tie-down points to secure cargo with straps, cords, hooks, and the like. The invention may also be adapted using integrated or add-on modules to secure particular types of cargo, such as golf clubs or scuba tanks, for example.

While the best mode for carrying out the invention has been described in detail, those familiar with the art to which this invention relates will recognize various alternative designs and embodiments for practicing the invention as defined by the following claims.

What is claimed is:

1. A cargo management system for a vehicle, the system comprising:
   a load floor panel pivotally connected by a first edge to a base to be substantially flush with the base when stowed;
   a rigid grid pivotally connected to a second edge of the load floor panel, the grid cooperating with the load floor panel from a stowed position beneath the load floor panel substantially hidden from view to be deployable to at least a first position above and generally parallel to the base and a second position generally transverse to the base extending in a direction of the load floor panel to separate a cargo area from a passenger area of the vehicle.

2. The system of claim 1 wherein the rigid grid pivots about the load floor panel to be deployable to a third position exposed to the cargo area with a second edge of the grid contacting the vehicle floor.

3. The system of claim 2 wherein the third position is generally parallel to the base.

4. The system of claim 2 wherein the third position is generally transverse to the base.

5. The system of claim 1 further comprising:
a close-out cover that cooperates with the base to conceal cargo stored in the base and to provide a secondary load floor when the load floor panel is deployed.

6. The system of claim 5 wherein the close-out cover is pivotally connected to the base.

7. The system of claim 5 wherein at least one of the close-out cover and the load floor panel includes at least one cargo management device that extends into the cargo area to secure cargo.

8. The system of claim 7 wherein the at least one cargo management device comprises a pair of foldable extensions integrated with an underside of at least one of the close-out cover and the load floor panel.

9. The system of claim 1 wherein the rigid grid pivots substantially one revolution about the load floor panel to expose the grid to the cargo area when the load floor panel is deployed to either a position generally perpendicular to the vehicle floor or a position generally parallel to the vehicle floor.

10. A cargo management system for a vehicle, the system comprising:
a first load floor panel pivotably connected along a first edge to a vehicle floor component, the first load floor panel having a stowed position substantially flush with a vehicle floor and covering a cargo storage space in the vehicle floor and a deployed position extending upward from the vehicle floor;
a rigid grid connected along its first edge to a second edge of the first load floor panel to pivot about the second edge between a first position in contact with an underside surface of the first load floor panel in said stowed position, a second position generally parallel to and above the vehicle floor to provide a horizontal surface to provide storage space for cargo on the horizontal surface and contain cargo below the horizontal surface, and a third position extending from the first load floor panel upward toward a roof of the vehicle to substantially separate a cargo space from a passenger space of the vehicle; and
a second load floor panel pivotably connected along a first edge to the vehicle floor component to provide access to the cargo storage space and to provide a secondary load floor when the first load floor panel is in a deployed position.

11. The system of claim 10 wherein the second load floor panel comprises at least two panels connected to pivot along axes generally transverse to a pivot axis of the first load floor panel.

12. The system of claim 10 wherein at least one of the load floor panels includes a cargo management device connected to the underside surface.

13. The system of claim 12 wherein the cargo management device is integrated with at least one of the load floor panels.

14. The system of claim 10 wherein the rigid grid includes a second edge opposite the first edge connectable to the first edge of the first load floor panel.

15. A cargo management device for use in a vehicle having a cargo storage compartment in a vehicle floor, the cargo management device comprising:
a base having sides for extending at least partially into the storage compartment and an opening to provide access to the storage compartment; and
a foldable panel having a solid portion with a first edge connected to pivot about an edge of the base between a stowed position generally parallel with the base and covering the opening, and a deployed position providing access to the storage compartment extending upward from the base, the foldable panel including a rigid perforated portion foldable to contact either side of the solid portion along an axis generally parallel to the first edge of the foldable panel, the perforated portion being positionable between at least a stowed position substantially hidden from view beneath the solid portion, a horizontal position to support cargo and contain cargo beneath the perforated portion, and a generally vertical position extending away from the base.

16. The device of claim 15 further comprising a close-out panel for covering the opening in the base when the solid portion of the foldable panel is in the deployed position.

17. The device of claim 16 wherein the close-out panel is pivotally connected to the base.

18. The device of claim 15 wherein the foldable panel includes at least one cargo securing device extendable from the solid portion to secure cargo.

* * * * *